US012205746B2

(12) United States Patent
Yang et al.

(10) Patent No.: US 12,205,746 B2
(45) Date of Patent: Jan. 21, 2025

(54) COIL COMPONENT

(71) Applicant: SAMSUNG ELECTRO-MECHANICS CO., LTD., Suwon-si (KR)

(72) Inventors: Ju Hwan Yang, Suwon-si (KR); Seung Mo Lim, Suwon-si (KR); Tae Jun Choi, Suwon-si (KR); Byung Soo Kang, Suwon-si (KR); Yong Hui Li, Suwon-si (KR); Tai Yon Cho, Suwon-si (KR); No Il Park, Suwon-si (KR); Yoon Mi Cha, Suwon-si (KR); Boum Seock Kim, Suwon-si (KR); Seung Min Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1027 days.

(21) Appl. No.: 17/164,037

(22) Filed: Feb. 1, 2021

(65) Prior Publication Data

US 2022/0157510 A1 May 19, 2022

(30) Foreign Application Priority Data

Nov. 17, 2020 (KR) ........................ 10-2020-0153254

(51) Int. Cl.
*H01F 27/28* (2006.01)
*H01F 27/29* (2006.01)
(Continued)

(52) U.S. Cl.
CPC ......... *H01F 27/2804* (2013.01); *H01F 27/29* (2013.01); *H01F 27/32* (2013.01);
(Continued)

(58) Field of Classification Search
CPC ...... H01F 27/2804; H01F 27/29; H01F 27/32; H01F 41/041; H01F 41/12; H01F 2027/2809; H01F 17/0013; H01F 27/292; H01F 2017/048; H01F 27/022; H01F 5/06; H01F 5/04; H01F 27/02; H01F 17/04;
(Continued)

(56) References Cited

U.S. PATENT DOCUMENTS

2016/0225517 A1* 8/2016 Choi .................. H01F 17/0013
2019/0189338 A1* 6/2019 Kim .................... H01F 27/2828
(Continued)

FOREIGN PATENT DOCUMENTS

KR 10-2093147 B1 3/2020
KR 10-2145312 B1 8/2020

*Primary Examiner* — Malcolm Barnes
(74) *Attorney, Agent, or Firm* — Morgan, Lewis & Bockius LLP

(57) ABSTRACT

A coil component includes a body having one surface and the other surface, opposing each other, both lateral surfaces respectively connecting the one surface and the other surface and opposing each other, and both end surfaces respectively connecting the both lateral surfaces and opposing each other; a coil unit disposed in the body; a first external electrode and a second external electrode, respectively connected to the coil unit and disposed to be spaced apart from each other on the one surface of the body; and a first insulating layer covering the other surface of the body, the both lateral surfaces of the body, and the both end surfaces of the body.

20 Claims, 7 Drawing Sheets

(51) Int. Cl.

| | |
|---|---|
| ***H01F 27/32*** | (2006.01) |
| ***H01F 41/04*** | (2006.01) |
| ***H01F 41/12*** | (2006.01) |

(52) U.S. Cl.
CPC ........... *H01F 41/041* (2013.01); *H01F 41/12* (2013.01); *H01F 2027/2809* (2013.01)

(58) Field of Classification Search
CPC ... H01F 2017/002; H01F 27/23; H01F 41/005
See application file for complete search history.

(56) References Cited

U.S. PATENT DOCUMENTS

| | | | | |
|---|---|---|---|---|
| 2020/0118729 | A1* | 4/2020 | Lim | H01F 27/324 |
| 2020/0168391 | A1* | 5/2020 | Yang | H01F 17/0013 |
| 2022/0157510 | A1* | 5/2022 | Yang | H01F 41/041 |
| 2022/0181071 | A1* | 6/2022 | Shin | H01F 17/0013 |

* cited by examiner

COIL COMPONENT

CROSS-REFERENCE TO RELATED APPLICATION(S)

This application claims benefit of priority to Korean Patent Application No. 10-2020-0153254 filed on Nov. 17, 2020 in the Korean Intellectual Property Office, the disclosure of which is incorporated herein by reference in its entirety.

BACKGROUND

1. Field

The present disclosure relates to a coil component.

2. Description of Related Art

As electronic devices become smaller, coil components such as inductors are also required to be reduced in size. Meanwhile, in order to have the required characteristics of the coil components, it is necessary to minimize sizes of the coil components while securing an effective volume of the magnetic material.

SUMMARY

An aspect of the present disclosure is to provide a coil component including a thin insulating layer having a relatively thin thickness.

Another aspect of the present disclosure is to provide a coil component is capable of increasing an effective volume of a magnetic material.

According to an aspect of the present disclosure, a coil component includes a body having one surface and the other surface, opposing each other, both lateral surfaces respectively connecting the one surface and the other surface and opposing each other, and both end surfaces respectively connecting the both lateral surfaces and opposing each other; a coil unit disposed in the body; a first external electrode and a second external electrode, respectively connected to the coil unit and disposed to be spaced apart from each other on the one surface of the body; and a first insulating layer covering the other surface of the body, the both lateral surfaces of the body, and the both end surfaces of the body, wherein the first insulating layer on each of the both end surfaces of the body includes a first region, a second region, and a third region, sequentially disposed in a direction from the other surface of the body to the one surface of the body, an average thickness of the first insulating layer in the first region is greater than an average thickness of the first insulating layer in the second region, an average thickness of the first insulating layer in the second region is greater than an average thickness of the first insulating layer in the third region.

According to another aspect of the present disclosure, a coil component includes a body having one surface and the other surface, opposing each other, both lateral surfaces respectively connecting the one surface and the other surface and opposing each other, and both end surfaces respectively connecting the both lateral surfaces and opposing each other; a slit formed in an edge portion between each of the both end surfaces of the body and the one surface of the body; a coil unit disposed in the body and at least partially exposed through the slit; a first external electrode and a second external electrode, at least partially disposed in the slit and connected to the coil unit, respectively; and a first insulating layer covering the other surface of the body, the both lateral surfaces of the body, and the both end surfaces of the body, wherein a thickness of the first insulating layer on the other surface of the body is greater than a thickness of the first insulating layer on each of the both end surfaces of the body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, the present disclosure will be described with reference to the accompanying drawings. In each of the drawings, a shape and a size of each component may be exaggerated or reduced.

Coil Component

Figure 1:
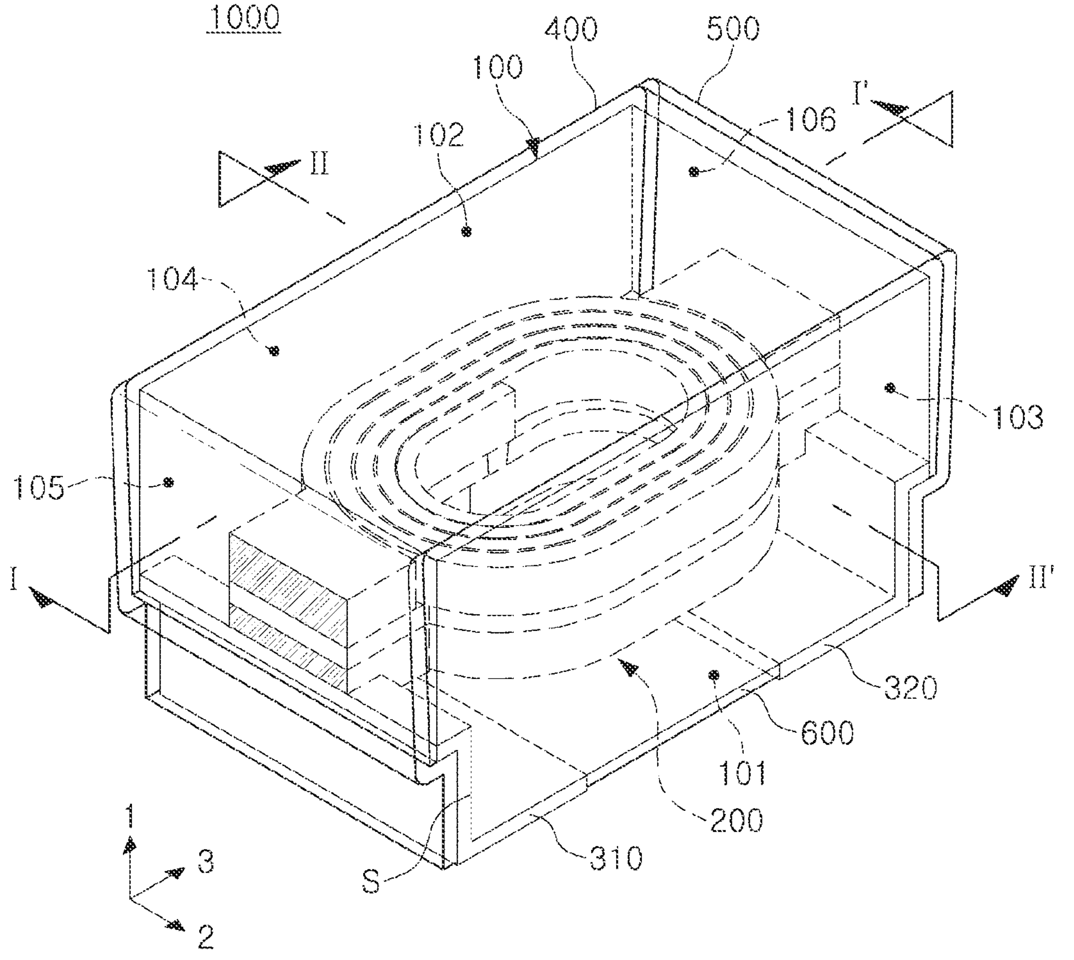
FIG. 1 is a schematic perspective view of a coil component according to an embodiment of the present disclosure.

FIG. 1 is a schematic perspective view of a coil component according to an embodiment of the present disclosure.

Figure 2:
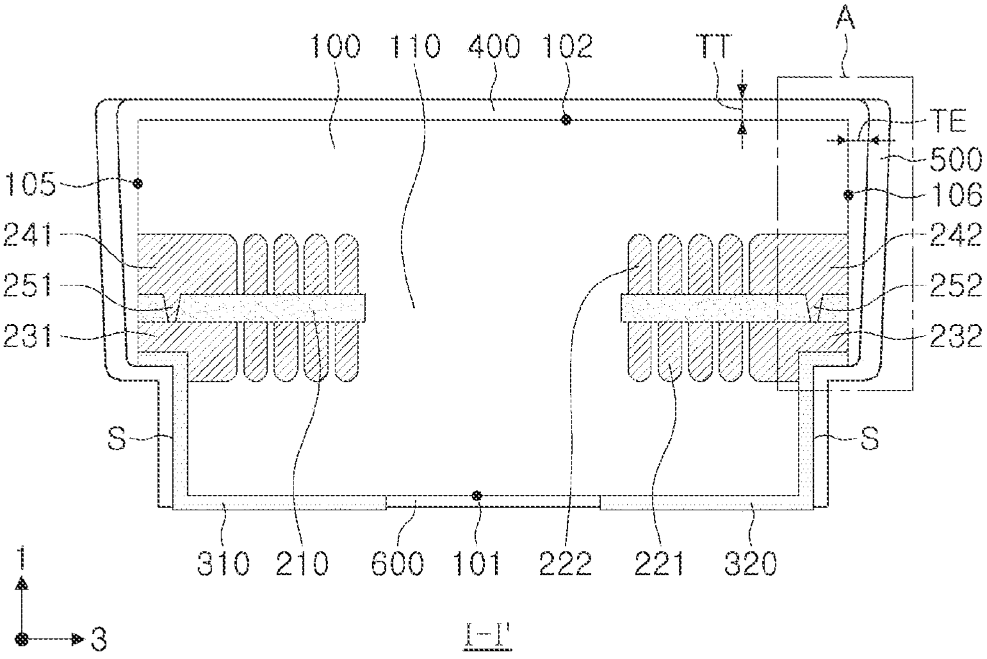
FIG. 2 is a schematic cross-sectional view of a coil component according to an embodiment of the present disclosure, taken along line I-I'.

FIG. 2 is a schematic cross-sectional view of a coil component according to an embodiment of the present disclosure, taken along line I-I'.

Figure 3:
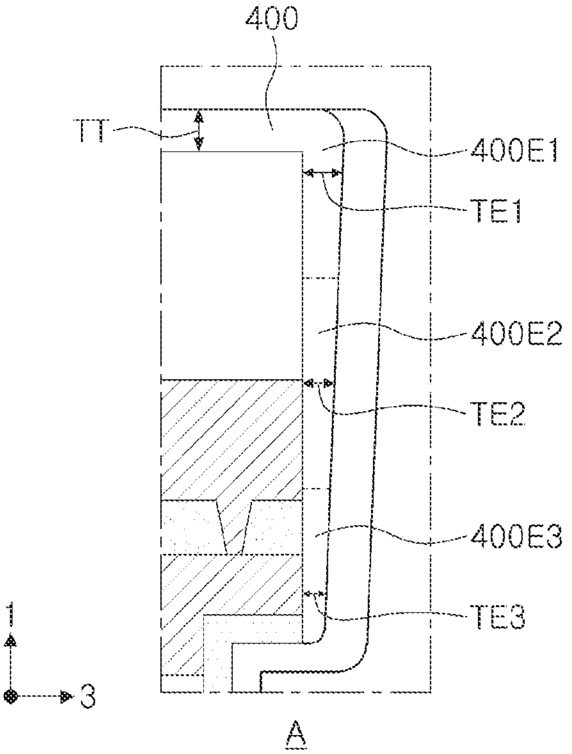
FIG. 3 is an enlarged view of portion A of FIG. 2.

FIG. 3 is an enlarged view of portion A of FIG. 2.

Figure 4:
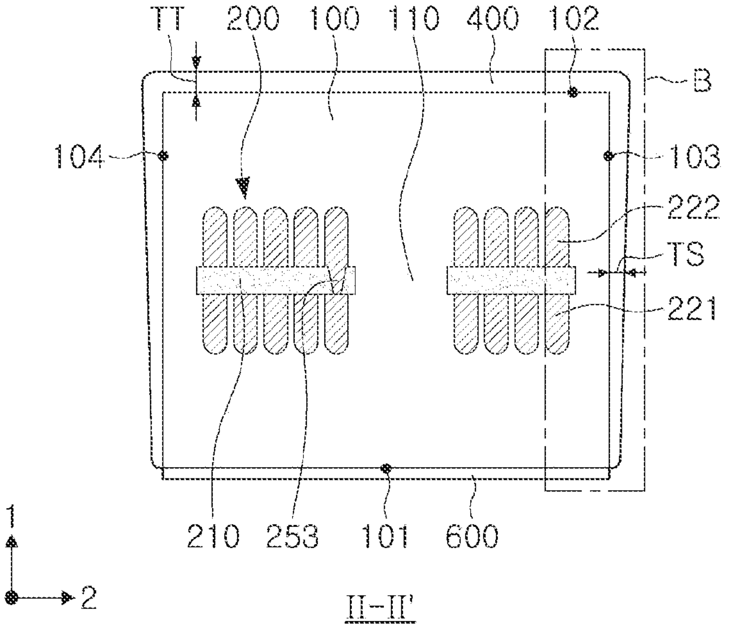
FIG. 4 is a schematic cross-sectional view of a coil component according to an embodiment of the present disclosure, taken along line II-II'.

FIG. 4 is a schematic cross-sectional view of a coil component according to an embodiment of the present disclosure, taken along line II-II'.

Figure 5:
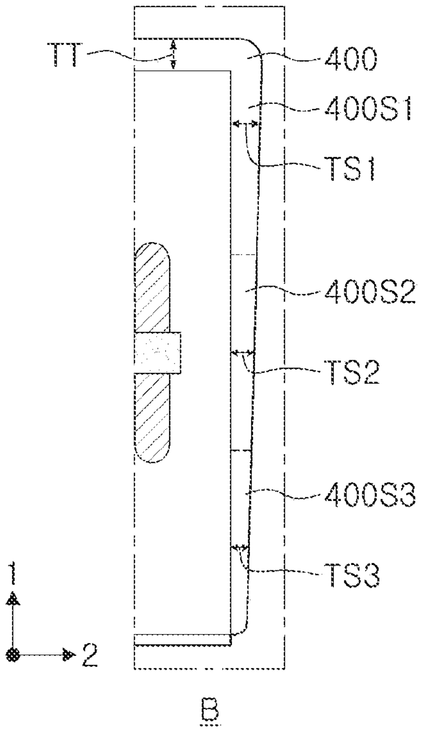
FIG. 5 is an enlarged view of portion B of FIG. 4.

FIG. 5 is an enlarged view of portion B of FIG. 4.

Referring to the drawings, a coil component 1000 according to an embodiment of the present disclosure may include a body 100 having one surface 101 and the other surface 102, opposing each other, both lateral surfaces 103 and 104 respectively connecting the one surface 101 and the other surface 102 and opposing each other, and both end surfaces 105 and 106 respectively connecting the both lateral surfaces 103 and 104 and opposing each other; a coil unit 200 disposed in the body 100; a first external electrode 310 and a second external electrode 320, respectively connected to the coil unit 200 and disposed to be spaced apart from each other on the one surface 101 of the body 100; and a first insulating layer 400 covering the other surface 102 of the body 100, the both lateral surfaces 103 and 104 of the body 100, and the both end surfaces 105 and 106 of the body 100.

A coil component 1000 according to an embodiment of the present disclosure may include a slit S. The slit S may be formed in an edge portion between each of the both end surfaces 105 and 106 of the body 100 and the one surface 101 of the body 100. In this case, the coil unit 200 may be at least partially exposed through the slit S, and the first external electrode 310 and the second external electrode 320 may be at least partially disposed in the slit S, and may be connected to the coil unit 200, respectively.

A coil component 1000 according to an embodiment of the present disclosure may further include a second insulating layer 500. The second insulating layer 500 may cover a region of each of the first external electrode 310 and the second external electrode 320, disposed in the slit S, and may extend onto the both end surfaces 105 and 106 of the body 100 to further cover at least a portion of the first insulating layer 400.

A coil component 1000 according to an embodiment of the present disclosure may further include a third insulating layer 600. The third insulating layer 600 may cover a region of the one surface 101 of the body 100 disposed between the first external electrode 310 and the second external electrode 320.

Referring to FIGS. 2 to 3, a thickness TT of the first insulating layer 400 on the other surface 102 of the body 100 may be greater than a thickness TE of the first insulating layer 400 on each of the both end surfaces 105 and 106 of the body 100. In this case, the thickness TT of the first insulating layer 400 on entire regions of the other surface 102 of the body 100 may be greater than the thickness TE of the first insulating layer 400 on entire regions of each of the both end surfaces 105 and 106 of the body 100. The thickness TT of the first insulating layer 400 on the other surface 102 of the body 100 may not be constant, and, as will be described later, the thickness TE of the first insulating layer 400 on the both end surfaces 105 and 106 of the body 100 may not be constant. In this case, the thicknesses TT and TE of the first insulating layer 400 may refer to an average thickness of the first insulating layer 400.

The thickness TE of the first insulating layer 400 on each of the both end surfaces 105 and 106 of the body 100 may be about 0.5 to about 1 of the thickness TT of the first insulating layer 400 on the other surface 102 of the body 100, but the present disclosure is not limited thereto.

In some embodiments, the thickness TE of the first insulating layer 400 on each of the both end surfaces 105 and 106 of the body 100 may decrease in a direction from the other surface 102 of the body 100 to the one surface 101 of the body 100. The thickness TE of the first insulating layer 400 on each of the both end surfaces 105 and 106 of the body 100 may gradually decrease in a direction from the other surface 102 of the body 100 to the one surface 101 of the body 100, and may decrease to include one or more regions having a step difference in a region between the other surface 102 of the body 100 and the one surface 101 of the body 100. In some embodiments, the first insulating layer 400 on each of the both end surfaces 105 and 106 of the body 100 may also include a region in which the thickness TE increases in a direction from the other surface 102 of the body 100 to the one surface 101 of the body 100.

Referring to FIG. 3, the first insulating layer 400 on each of the both end surfaces 105 and 106 of the body 100 may include a first region 400E1, a second region 400E2, and a third region 400E3, sequentially disposed in a direction from the other surface 102 of the body 100 to the one surface 101 of the body 100. The first region 400E1, the second region 400E2, and the third region 400E3 may refer to terms for distinguishing regions adjacent to each other of the first insulating layer 400 integrally formed on each of the both end surfaces 105 and 106 of the body 100, and a boundary indicated by a dotted line on the drawings may be a virtual line for convenience of explanation. The first region 400E1, the second region 400E2, and the third region 400E3 may have the same length or different lengths in a direction from the other surface 102 of the body 100 to the one surface 101 of the body 100.

An average thickness TE1 of the first insulating layer 400 in the first region 400E1 may be greater than an average thickness TE2 of the first insulating layer 400 in the second region 400E2, and the average thickness TE2 of the first insulating layer 400 in the second region 400E2 may be greater than an average thickness TE3 of the first insulating layer 400 in the third region 400E3. A coil component according to an embodiment of the present disclosure may have such a structure by decreasing the thickness TE of the first insulating layer 400 on each of the both end surfaces 105 and 106 of the body 100 in a direction from the other surface 102 of the body 100 to the one surface 101 of the body 100, as described above.

Referring to FIGS. 4 to 5, a thickness TT of the first insulating layer 400 on the other surface 102 of the body 100 may be greater than a thickness TS of the first insulating layer 400 on each of the both lateral surfaces 103 and 104 of the body 100. In this case, the thickness TT of the first insulating layer 400 on entire regions of the other surface 102 of the body 100 may be greater than the thickness TS of the first insulating layer 400 on entire regions of each of the both lateral surfaces 103 and 104 of the body 100. The thickness TT of the first insulating layer 400 on the other surface 102 of the body 100 may not be constant, and as will be described later, the thickness TS of the insulating layer 400 on each of the both lateral surfaces 103 and 104 of the body 100 may not be constant. In this case, the thicknesses TT and TS of the first insulating layer 400 may refer to an average thickness of the first insulating layer 400.

The thickness TS of the first insulating layer 400 on each of the both lateral surfaces 103 and 104 of the body 100 may be about 0.5 to about 1 of the thickness TT of the first insulating layer 400 on the other surface 102 of the body 100, but the present disclosure is not limited thereto. The thickness TS of the first insulating layer 400 on each of the both lateral surfaces 103 and 104 of the body 100 may be the same as or different from the thickness TE of the first insulating layer 400 on each of the both end surfaces 105 and 106 of the body 100.

In some embodiments, the thickness TS of the first insulating layer 400 on each of the both lateral surfaces 103 and 104 of the body 100 may decrease in a direction from the other surface 102 of the body 100 to the one surface 101 of the body 100. The thickness TS of the first insulating layer 400 on each of the both lateral surfaces 103 and 104 of the body 100 may gradually decrease in a direction from the other surface 102 of the body 100 to the one surface 101 of the body 100, and may decrease to include one or more regions having a step difference in a region between the other surface 102 of the body 100 and the one surface 101 of the body 100. In some embodiments, the first insulating layer 400 on each of the both lateral surfaces 103 and 104 of the body 100 may also include a region in which the thickness TS increases in a direction from the other surface 102 of the body 100 to the one surface 101 of the body 100.

Referring to FIG. 5, the first insulating layer 400 on each of the both lateral surfaces 103 and 104 of the body 100 may include a first region 400S1, a second region 400S2, and a third region 400S3, sequentially disposed in a direction from the other surface 102 of the body 100 to the one surface 101 of the body 100. The first region 400S1, the second region 400S2, and the third region 400S3 may refer to terms for distinguishing regions adjacent to each other of the first insulating layer 400 integrally formed on each of the both lateral surfaces 103 and 104 of the body 100, and a boundary indicated by a dotted line on the drawings may be a virtual line for convenience of explanation. The first region 400S1, the second region 400S2, and the third region 400S3 may have the same length or different lengths in a direction from the other surface 102 of the body 100 to the one surface 101 of the body 100.

An average thickness TS1 of the first insulating layer 400 in the first region 400S1 may be greater than an average thickness TS2 of the first insulating layer 400 in the second region 400S2, and the average thickness TS2 of the first insulating layer 400 in the second region 400S2 may be greater than an average thickness TS3 of the first insulating layer 400 in the third region 400S3. A coil component 1000 according to an embodiment of the present disclosure may have such a structure by decreasing the thickness TS of the first insulating layer 400 on each of the both lateral surfaces 103 and 104 of the body 100 in a direction from the other surface 102 of the body 100 to the one surface 101 of the body 100, as described above. A method of measurement of the thickness of the first insulating layer includes, but not limited to, a method using an optical microscope. Specifically, it can be used as a measurement sample by polishing from the surface 103 or 104 to the surface passing through the center of the coil component so as to be parallel to 103 and 104 of the body 100. Next, the first insulating layer 400 can be observed using an optical microscope, and the cross section of the first insulating layer 400 is divided into three regions (400S1, 400S2, 400S3), and three points of each region by calculating the arithmetic mean value of the thickness measured in, the thickness of each region (TS1, TS3, TS3) can be obtained.

In a coil component 1000 according to an example, the first insulating layer 400 may be prepared by forming an insulating material on the other surface 102, the both lateral surfaces 103 and 104, and the both end surfaces 105 and 106 of the body 100 by a chemical vapor deposition (CVD) process. In this case, since a gas may flow in a direction from the other surface 102 of the body 100 to the one surface 101 of the body 100, thicknesses of the first insulating layer 400 on the other surface 102, the both lateral surfaces 103 and 104, and the both end surfaces 105 and 106 of the body 100 may be formed to be different from each other, as described above.

The present inventors have confirmed that when a first insulating layer 400 is formed as described above, a thin insulating layer in which the first insulating layer 400 has a thin thickness of 5 μm or less at any points may be formed. Therefore, a coil component is capable of increasing an effective volume of a magnetic material based on the same volume may be provided.

Hereinafter, a configuration of a coil component 1000 according to an embodiment of the present disclosure will be described in more detail.

The body 100 may form an exterior of a coil component 1000 according to this embodiment, and the coil unit 200 may be embedded therein.

The one surface 101 and the other surface 102 of the body 100 may oppose each other in a first direction 1, the both lateral surfaces 103 and 104 of the body 100 may oppose each other in a second direction 2, perpendicular to the first direction 1, and the both end surfaces 105 and 106 of the body 100 may oppose each other in a third direction 3, perpendicular to each of the first and second directions 1 and 2. The body 100 may be formed in a hexahedral shape overall, but is not limited thereto.

The body 100 may include a magnetic material and a resin. Specifically, the body 100 may be formed by stacking one or more magnetic composite sheets including a magnetic material dispersed in a resin. The magnetic material may be a ferrite powder or a metal magnetic powder.

Examples of the ferrite powder may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder may include any one or more selected from the group consisting of iron (Fe), silicon (Si), chromium (Cr), cobalt (Co), molybdenum (Mo), aluminum (Al), niobium (Nb), copper (Cu), nickel (Ni), and alloys thereof. For example, the metal magnetic powder may include at least one or more of a pure iron powder, a Fe—Si-based alloy powder, a Fe—Si—Al-based alloy powder, a Fe—Ni-based alloy powder, a Fe—Ni—Mo-based alloy powder, a Fe—Cr-based alloy powder, or a Fe—Cr—Si-based alloy powder.

The metallic magnetic powder may be amorphous or crystalline form. For example, the metal magnetic powder may be a Fe—Si—B—Cr-based amorphous alloy powder, but is not limited thereto.

The resin may include one or more an epoxy resin, a polyimide, a liquid crystal polymer, or the like, but is not limited thereto.

The body 100 may include a core 110 passing through the coil unit 200 to be described later. The core 110 may be formed by filling a through-hole of the coil unit 200 with a magnetic composite sheet, but is not limited thereto.

The slit S may be formed in an edge portion between each of the both end surfaces 105 and 106 of the body 100 and the one surface 101 of the body 100. In this case, the edge portion may refer to a region adjacent to an intersection between a virtual surface extending each of the both end surfaces 105 and 106 of the body 100 in the first direction 1 and a virtual surface extending the one surface 101 of the body 100 in the third direction 3.

The slit S may be formed by removing a partial region of the body 100 in the first direction 1 from the one surface 101 of the body 100 to the other surface 102 of the body 100. The slit S may not entirely pass through the body 100 in the first direction 1 from the one surface 101 of the body 100 to the other surface 102 of the body 100. Specifically, in a coil bar, which is a state before individualizing a plurality of coil components, the slit S may be formed by performing pre-dicing on one surface 101 of the coil bar on a boundary disposed between both end surfaces 105 and 106 of each of the plurality of coil components, among boundaries for individualizing the coil components. In such pre-dicing, a depth of the slit S may be adjusted to expose lead-out portions 231 and 232, described later, through the slit S as illustrated in FIG. 2.

The slit S may extend to the both lateral surfaces 103 and 104 of the body 100 in the second direction 2. Therefore, the slit S may pass through entirely the body 100 in the second direction 2, in the edge portion between each of the both end surfaces 105 and 106 of the body 100 and the one surface 101 of the body 100.

An inner wall surface and a bottom surface of the slit S may also constitute a surface of the body 100. In this specification, for convenience of description, the inner wall surface and the bottom surface of the slit S are distinguished from the surfaces 101, 102, 103, 104, 105, and 106 of the body 100.

The coil unit 200 may be embedded in the body 100 to express characteristics of a coil component. For example, when the coil component 1000 of this embodiment is used as a power inductor, the coil unit 200 may serve to stabilize power of an electronic device by storing an electric field as a magnetic field and maintaining an output voltage.

The coil unit 200 may include a support substrate 210, first and second coil patterns 221 and 222, first and second lead-out portions 231 and 232, first and second auxiliary lead-out portions 241 and 242, and vias 251, 252, and 253. For example, as illustrated in FIGS. 2 and 4, a first coil pattern 221 and lead-out portions 231 and 232 may be disposed on a lower surface of the support substrate 210, a second coil pattern 222 and auxiliary lead-out portions 241 and 242 may be disposed on an upper surface of the support substrate 210, and first, second and third vias 251, 252, and 253 may be formed to pass through the support substrate 210.

The first coil pattern 221 may be in contact with and connected to the first lead-out portion 231, and the first coil pattern 221 and the first lead-out portion 231 may be spaced apart from the second lead-out portion 232. The second coil pattern 222 may be in contact with and connected to the second auxiliary lead-out portion 242, and the second coil pattern 222 and the second auxiliary lead-out portion 242 may be spaced apart from the first auxiliary lead-out portion 241. A first via 251 may connect the first lead-out portion 231 and the first auxiliary lead-out portion 241 to each other, a second via 252 may connect the second lead-out portion 232 and the second auxiliary lead-out portion 242 to each other, and the third via 253 may connect the first coil pattern 221 and the second coil pattern 222 to each other. Therefore, the coil unit 200 may entirely function as a single coil.

Each of the first coil pattern 221 and the second coil pattern 222 may have a planar, spiral shape in which at least one turn is formed around the core 110.

Each of the first lead-out portion 231 and the second lead-out portion 232, which may be a portion of the coil unit 200, may be exposed through the slit S. For example, the slit S may be formed by removing a portion of the body 100 in the first direction 1 by the pre-dicing process described above, and further removing a portion of each of the first lead-out portion 231 and the second lead-out portion 232. Therefore, each of the first lead-out portion 231 and the second lead-out portion 232 may be exposed through the slit S. Therefore, the first lead-out portion 231 and the second lead-out portion 232 may be disposed on the inner wall surface and the bottom surface of the slit S. In addition, the first external electrode 310 and the second external electrode 320 may be respectively provided on the first lead-out portion 231 and the second lead-out portion 232, disposed on the inner wall surface and the bottom surface of the slit S.

The first lead-out portion 231 and the second lead-out portion 232 may be exposed from the both end surfaces 105 and 106 of the body 100, respectively, and the first auxiliary lead-out portion 241 and the second auxiliary lead-out portion 242 may be also exposed from the both end surfaces 105 and 106 of the body 100, respectively.

A material for forming each of the first and second coil patterns 221 and 222, the first and second lead-out portions 231 and 232, the first and second auxiliary lead-out portions 241 and 242, and the first, second and third vias 251, 252, and 253 may comprises a conductive material such as copper (Cu), aluminum (Al), silver (Ag), tin (Sn), gold (Au), nickel (Ni), lead (Pb), titanium (Ti), or alloys thereof.

The first and second coil patterns 221 and 222, the first and second lead-out portions 231 and 232, the first and second auxiliary lead-out portions 241 and 242, and the first, second and third vias 251, 252, and 253 may include at least one conductive layer. For example, the first and second coil patterns 221 and 222, the first and second lead-out portions 231 and 232, the first and second auxiliary lead-out portions 241 and 242, and the first, second and third vias 251, 252, and 253 may be formed by a plating process, and may include an electroless plating layer and an electrolytic plating layer disposed on the electroless plating layer, which may function as a seed layer.

Each of the first external electrode 310 and the second external electrode 320 may be at least partially disposed in the slit S. In addition, each of the first external electrode 310 and the second external electrode 320 may extend onto the one surface 101 of the body 100, and may be arranged to be spaced apart from each other. Specifically, each of the first external electrode 310 and the second external electrode 320 may form the inner wall surface and the bottom surface of the slit S, may extend onto the one surface 101 of the body 100, and may be arranged to be spaced apart from each other. In this case, each of the first external electrode 310 and the second external electrode 320 may be arranged to form the one surface 101 of the body 100, and spaced apart from each other in the third direction 3. Each of the first external electrode 310 and the second external electrode 320 may be connected to each of the first lead-out portion 231 and the second lead-out portion 232, exposed through the slit S, to implement a lower electrode structure.

The first insulating layer 400 may cover the other surface 102 of the body 100, the both lateral surfaces 103 and 104 of the body 100, and the both end surfaces 105 and 106 of the body 100, to play a role of insulating these surfaces. As necessary, the first insulating layer 400 may partially cover only some surface, among the other surface 102 of the body 100, the both lateral surfaces 103 and 104 of the body 100, and the both end surfaces 105 and 106 of the body 100. For example, the first insulating layer 400 may cover the other surface 102 of the body 100 and the both end surfaces 105 and 106 of the body 100, and may not cover the both lateral surfaces 103 and 104 of the body 100.

The first insulating layer 400 may be prepared by forming an insulating material on the other surface 102, the both lateral surfaces 103 and 104, and the both end surfaces 105 and 106 of the body 100 by a chemical vapor deposition (CVD) process, as described above. The first insulating layer 400 may be formed of an insulating material including at least one of polyacrylate or parylene, and thus, the first insulating layer 400 may include at least one of polyacrylate or parylene. I some embodiments, Polyacylate may include polyacrylate derivatives, and parylene may include parylene N, parylene C, parylene D, and other parylene derivatives.

A thickness of the first insulating layer 400 may be 10 μm or less, and preferably 5 μm or less at any points. Therefore, a coil component is capable of increasing an effective volume of a magnetic material based on the same volume may be provided.

The first insulating layer 400 may not be formed in the slit S. Therefore, a length of the first insulating layer 400 on the both lateral surfaces 103 and 104 of the body 100 in the first direction 1 may be different from a length of the first insulating layer 400 on the both end surfaces 105 and 106 of the body 100 in the first direction 1. Specifically, a length of the first insulating layer 400 on the both lateral surfaces 103 and 104 of the body 100, in which the slit S is not formed, in the first direction 1 may be greater than a length of the first insulating layer 400 on the both end surfaces 105 and 106 of the body 100, in which the slit S is formed, in the first direction 1.

The second insulating layer 500 may cover a region of the first external electrode 310 and a region of the second external electrode 320, disposed in the slit S, to secure insulation of a remaining region, except for the one surface 101 of the body 100. The second insulating layer 500 may also extend onto the both end surfaces 105 and 106 of the body 100, to further cover at least a portion of the first insulating layer 400. In this case, on the both end surfaces 105 and 106 of the body 100, the first insulating layer 400 may be entirely covered by the second insulating layer 500, or only a portion of the first insulating layer 400 may be covered by the second insulating layer 500.

As a material for forming the second insulating layer 500, an insulating material may be used without limitation. For example, a thermoplastic resin such as polyimide, a thermosetting resin such as an epoxy resin, a photosensitive resin, or the like may be used.

A method of forming the second insulating layer 500 is not particularly limited, but may be formed by a process of printing an insulating material or applying a liquid insulating material. Alternatively, the second insulating layer 500 may also be formed by laminating an insulating film.

The third insulating layer 600 may prevent a short circuit between the first external electrode 310 and the second external electrode 320 on the one surface 101 of the body 100. As a material for forming the third insulating layer 600, a material having insulating properties may be used without limitation. For example, a thermoplastic resin such as polyimide, a thermosetting resin such as an epoxy resin, a photosensitive resin, or the like may be used.

A method of forming the third insulating layer 600 is also not particularly limited, but may be formed by a process of printing an insulating material or applying a liquid insulating material. Alternatively, the third insulating layer 600 may also be formed by laminating an insulating film.

Figure 6:
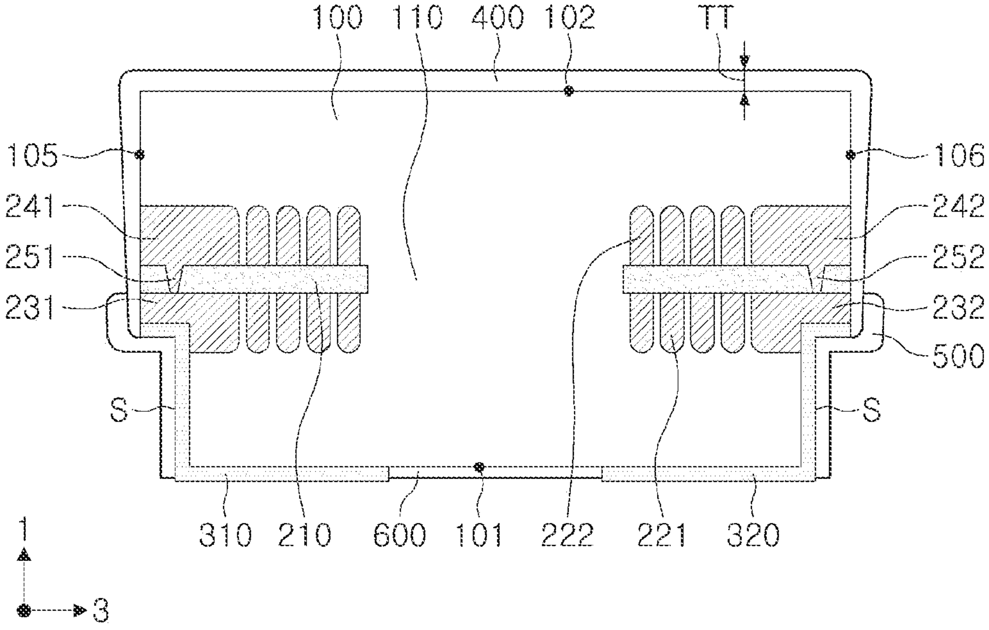
FIG. 6 is a schematic perspective view of a coil component according to a modified example of an embodiment of the present disclosure.

FIG. 6 is a schematic perspective view of a coil component according to a modified example of an embodiment of the present disclosure.

Referring to FIG. 6, in a coil component according to a modified example of the embodiment of the present disclosure, a second insulating layer 500 covers only a portion of a first insulating layer 400 on both end surfaces 105 and 106 of a body 100.

In addition, remaining descriptions may be applied in a manner substantially identical to the descriptions of the coil component according to the embodiments of the present disclosure, detailed descriptions thereof will be omitted.

Figure 7:
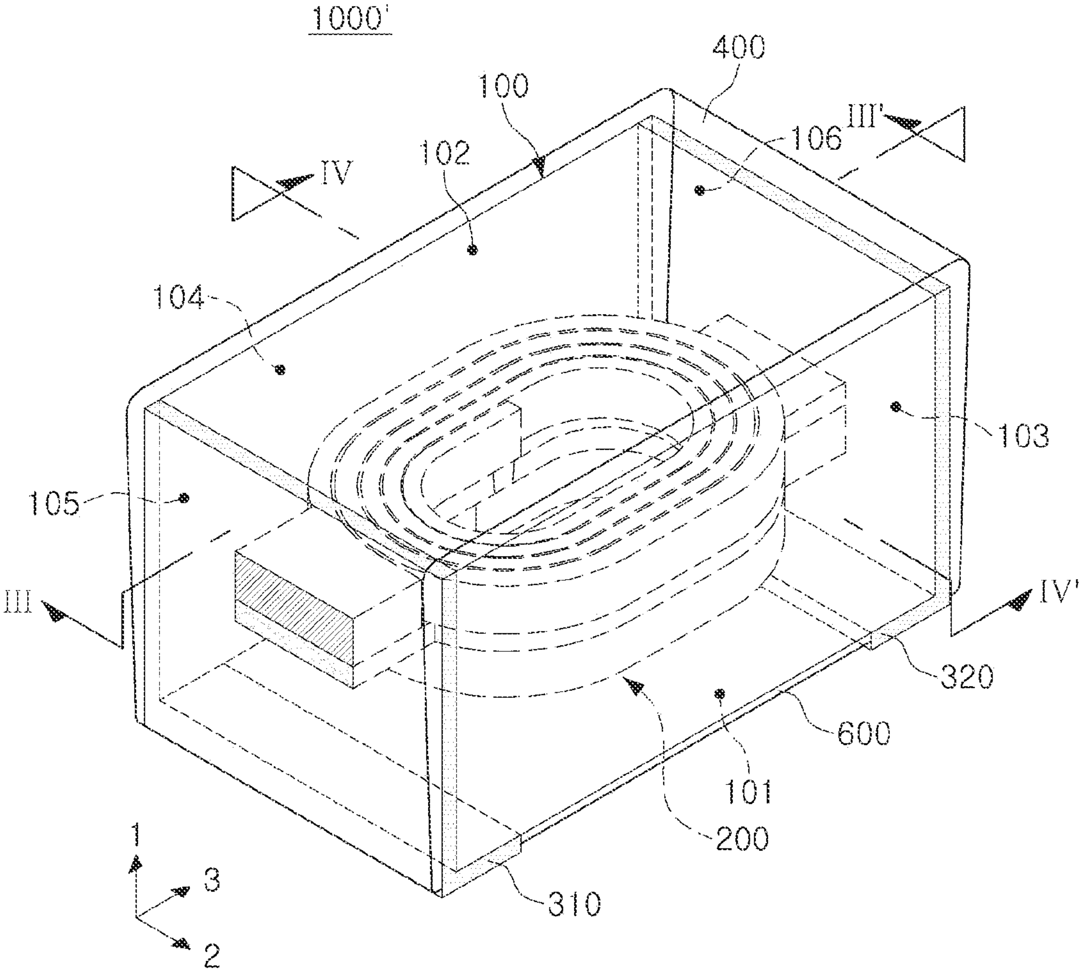
FIG. 7 is a schematic perspective view of a coil component according to another embodiment of the present disclosure.

FIG. 7 is a schematic perspective view of a coil component according to another embodiment of the present disclosure.

Figure 8:
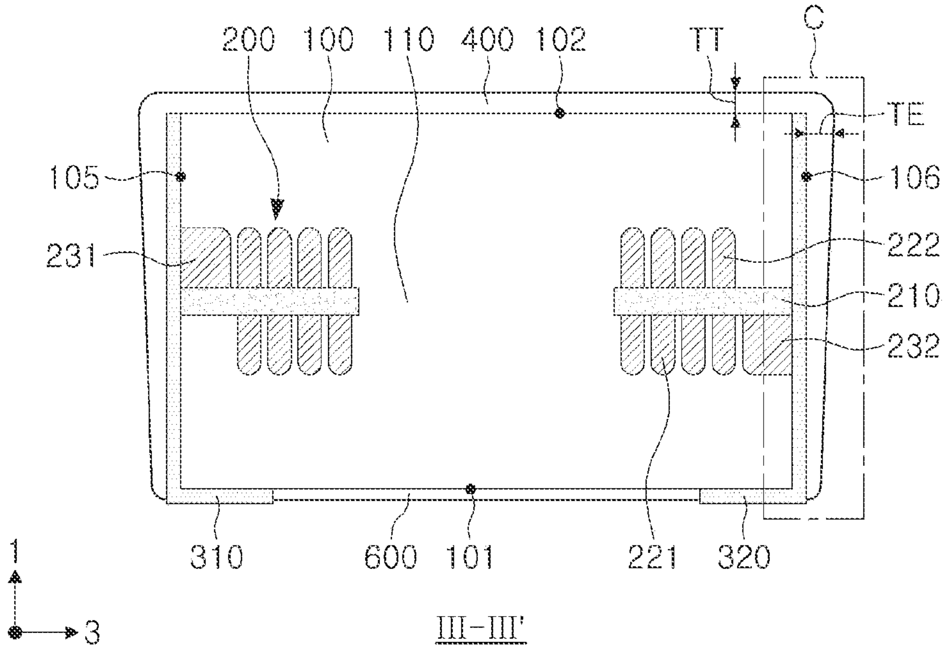
FIG. 8 is a schematic cross-sectional view of a coil component according to an embodiment of the present disclosure, taken along line III-III'.

FIG. 8 is a schematic cross-sectional view of a coil component according to an embodiment of the present disclosure, taken along line III-III'.

Figure 9:
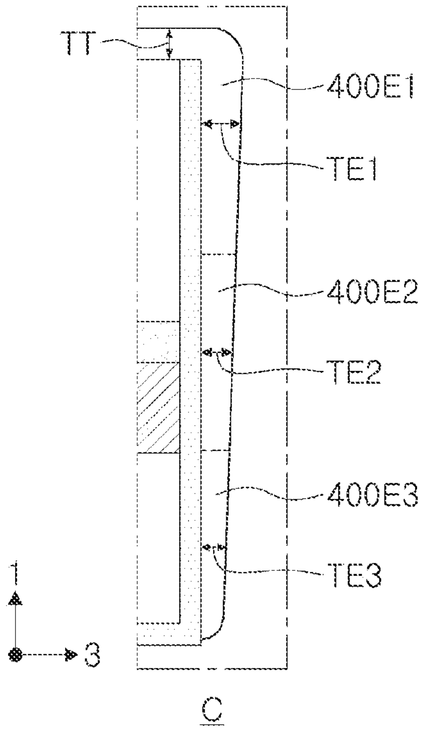
FIG. 9 is an enlarged view of portion C of FIG. 8.

FIG. 9 is an enlarged view of portion C of FIG. 8.

Figure 10:
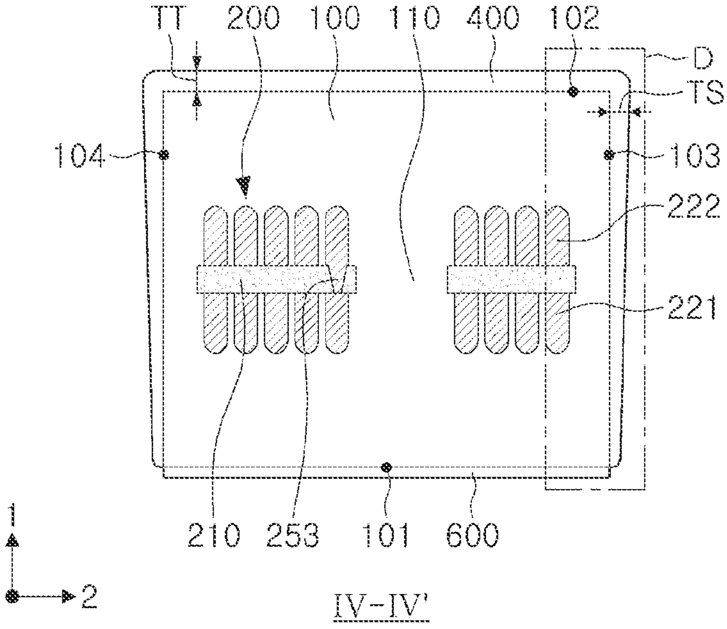
FIG. 10 is a schematic cross-sectional view of a coil component according to an embodiment of the present disclosure, taken along line IV-IV'.

FIG. 10 is a schematic cross-sectional view of a coil component according to an embodiment of the present disclosure, taken along line IV-IV'.

Figure 11:
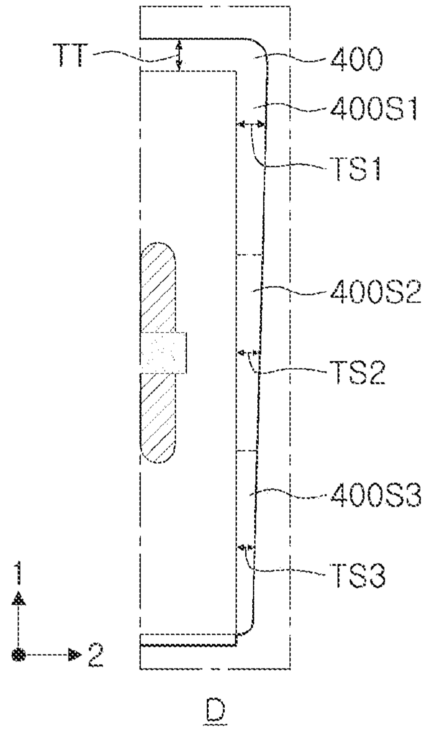
FIG. 11 is an enlarged view of portion D of FIG. 10.

FIG. 11 is an enlarged view of portion D of FIG. 10.

Referring to the drawings, in a coil component 1000' according to another embodiment of the present disclosure, no slit may be formed in a body 100.

In addition, a coil unit 200 may include a support substrate 210, first and second coil patterns 221 and 222, first and second lead-out portions 231 and 232, and a via 253, and may not include an auxiliary lead-out portion. For example, as illustrated in FIGS. 8 and 10, the first coil pattern 221 and the second lead-out part 232 may be disposed on a lower surface of the support substrate 210, the second coil pattern 222 and the first lead-out portion 231 may be disposed on an upper surface of the support substrate 210, and the via 253 may be formed to pass through the support substrate 210.

As illustrated in FIG. 8, a first external electrode 310 and a second external electrode 320 may cover both end surfaces 105 and 106 of the body 100, and may extend onto one surface 101 of the body 100, and are spaced apart from each other. Each of the first external electrode 310 and the second external electrode 320 may have an 'L' shape, but are not limited thereto. For example, the first external electrode 310 and the second external electrode 320 may have a 'C' shape.

As illustrated in FIG. 7, since a coil component 1000' according to another embodiment does not have a slit formed in the body 100, a first insulating layer 400 may entirely cover a region of each of the both end surfaces 105 and 106. In this case, no insulating layer 500 may be required.

In addition, remaining descriptions may be applied in a manner substantially identical to the descriptions of the coil component according to the embodiments of the present disclosure, detailed descriptions thereof will be omitted.

A coil component according to another embodiment of the present disclosure is provided to explain that a coil component of the present disclosure may have various structures, and a structure of a coil component according to the present disclosure should not be limited to the embodiments.

As used herein, the term "connect" or "connection" in the present specification may not be only a direct connection, but also a concept including an indirect connection. In addition, the term "electrically connected" or "electrical connection" in the present specification is a concept including both a physical connection and a physical non-connection.

The expression "example" used in this specification does not refer to the same embodiment to each other, but may be provided for emphasizing and explaining different unique features. The above-mentioned examples do not exclude that the above-mentioned examples are implemented in combination with the features of other examples. For example, although the description in a specific example is not described in another example, it may be understood as an explanation related to another example, unless otherwise described or contradicted by the other example.

In the present specification, the expressions of "first," second," etc. in the present specification are used to distinguish one component from another, and do not limit the order and/or importance of the components. In some cases, without departing from the spirit of the present disclosure, a "first" component may be referred to as a "second" component, and similarly, a "second" component may be referred to as a "first" component.

The terms used in the present disclosure are used only to illustrate various examples and are not intended to limit the present inventive concept. Singular expressions include plural expressions unless the context clearly dictates otherwise.

As one of various effects of the present disclosure, a coil component including a thin insulating layer having a relatively thin thickness may be provided.

As another effect of the various effects of the present disclosure, a coil component is capable of increasing an effective volume of a magnetic material may be provided.

While example embodiments have been illustrated and described above, it will be apparent to those skilled in the art that modifications and variations could be made without departing from the scope of the present disclosure as defined by the appended claims.

What is claimed is:

1. A coil component comprising:

a body having one surface and the other surface, opposing each other, both lateral surfaces respectively connecting the one surface and the other surface and opposing each other, and both end surfaces respectively connecting the both lateral surfaces and opposing each other;

a coil unit disposed in the body;

a first external electrode and a second external electrode, each connected to the coil unit and disposed to be spaced apart from each other on the one surface of the body; and a first insulating layer covering the other surface of the body, the both lateral surfaces of the body, and the both end surfaces of the body, wherein the first insulating layer on each of the both end surfaces of the body includes a first region, a second region, and a third region, sequentially disposed in a direction from the other surface of the body to the one surface of the body, the first region includes a boundary between the first insulating layer covering the other surface of the body and the end surface of the body, the third region includes an end portion of the first insulating layer covering one of the end surfaces of the body, an average thickness of the first insulating layer in the first region is greater than an average thickness of the first insulating layer in the second region, an average thickness of the first insulating layer in the second region is greater than an average thickness of the first insulating layer in the third region.

2. The coil component of claim 1, wherein a thickness of the first insulating layer on each of the both end surfaces of the body decreases in the direction from the other surface of the body to the one surface of the body.

3. The coil component of claim 1, wherein a thickness of the first insulating layer on each of the both lateral surfaces of the body decreases in the direction from the other surface of the body to the one surface of the body.

4. The coil component of claim 1, wherein a thickness of the first insulating layer on the other surface of the body is greater than a thickness of the first insulating layer on each of the both end surfaces of the body.

5. The coil component of claim 1, wherein a thickness of the first insulating layer on the other surface of the body is greater than a thickness of the first insulating layer on each of the both lateral surfaces of the body.

6. The coil component of claim 1, wherein a thickness of the first insulating layer on the other surface of the body, the both lateral surfaces of the body, and the both end surfaces of the body is 5 μm or less.

7. The coil component of claim 1, wherein the first insulating layer contains at least one of polyacrylate or parylene.

8. The coil component of claim 1, wherein a thickness TE of the first insulating layer on each of the end surfaces of the body is 0.5 to 1 of a thickness of the first insulating layer on the other surface of the body.

9. The coil component of claim 1, wherein the thickness of the first insulating layer on each of the lateral surfaces of the body is 0.5 to 1 of a thickness the first insulating layer on the other surface of the body.

10. The coil component of claim 1, wherein the first external electrode and the second external electrode cover the end surfaces of the body, extend onto the one surface of the body, and are spaced apart from each other.

11. The coil component of claim 1, wherein the coil unit includes:

a support substrate;

a first coil pattern disposed on a lower surface of the support substrate; and a second coil pattern disposed on an upper surface of the support substrate, wherein the third region of the first insulating layer covers the end surfaces of the body to which the support substrate is attached.

12. A coil component comprising:

a body having one surface and the other surface, opposing each other, both lateral surfaces respectively connecting the one surface and the other surface and opposing each other, and both end surfaces respectively connecting the both lateral surfaces and opposing each other;

a slit formed in an edge portion between each of the both end surfaces of the body and the one surface of the body;

a coil unit disposed in the body and at least partially exposed through the slit;

a first external electrode and a second external electrode, at least partially disposed in the slit and connected to the coil unit, respectively; and a first insulating layer covering the other surface of the body, the both lateral surfaces of the body, and the both end surfaces of the body, wherein the first insulating layer on each of the both end surfaces of the body includes a first region, a second region, and a third region, the first region includes a boundary between the first insulating layer covering the other surface of the body and the end surface of the body, the third region includes an end portion of the first insulating layer covering one of the end surfaces of the body, wherein a thickness of the first insulating layer on the other surface of the body is greater than a thickness of the first insulating layer on each of the both end surfaces of the body.

13. The coil component of claim 12, wherein a thickness of the first insulating layer on the other surface of the body is greater than a thickness of the first insulating layer on each of the both lateral surfaces of the body.

14. The coil component of claim 12, wherein a thickness of the first insulating layer on each of the both end surfaces of the body decreases in a direction from the other surface of the body to the one surface of the body.

15. The coil component of claim 12, wherein a thickness of the first insulating layer on each of the both lateral surfaces of the body decreases in a direction from the other surface of the body to the one surface of the body.

16. The coil component of claim 12, further comprising a second insulating layer covering a region of each of the first and second external electrodes, disposed in the slit.

17. The coil component of claim 16, wherein the second insulating layer extends onto the both end surfaces of the body to further cover at least a portion of the first insulating layer.

18. The coil component of claim 16, wherein the second insulating layer covers only a portion of the first insulating layer 400 on end surfaces of the body.

19. The coil component of claim 12, wherein the first external electrode and the second external electrode extend on the one surface of the body, and are spaced apart from each other.

20. The coil component of claim 19, further comprising a third insulating layer covering a region of the one surface of the body disposed between the first external electrode and the second external electrode.

* * * * *